Feb. 6, 1968  P. T. LETH  3,367,477
APPARATUS FOR ORIENTING TAPERED AGRICULTURAL PRODUCTS
Filed Oct. 28, 1966  5 Sheets-Sheet 2
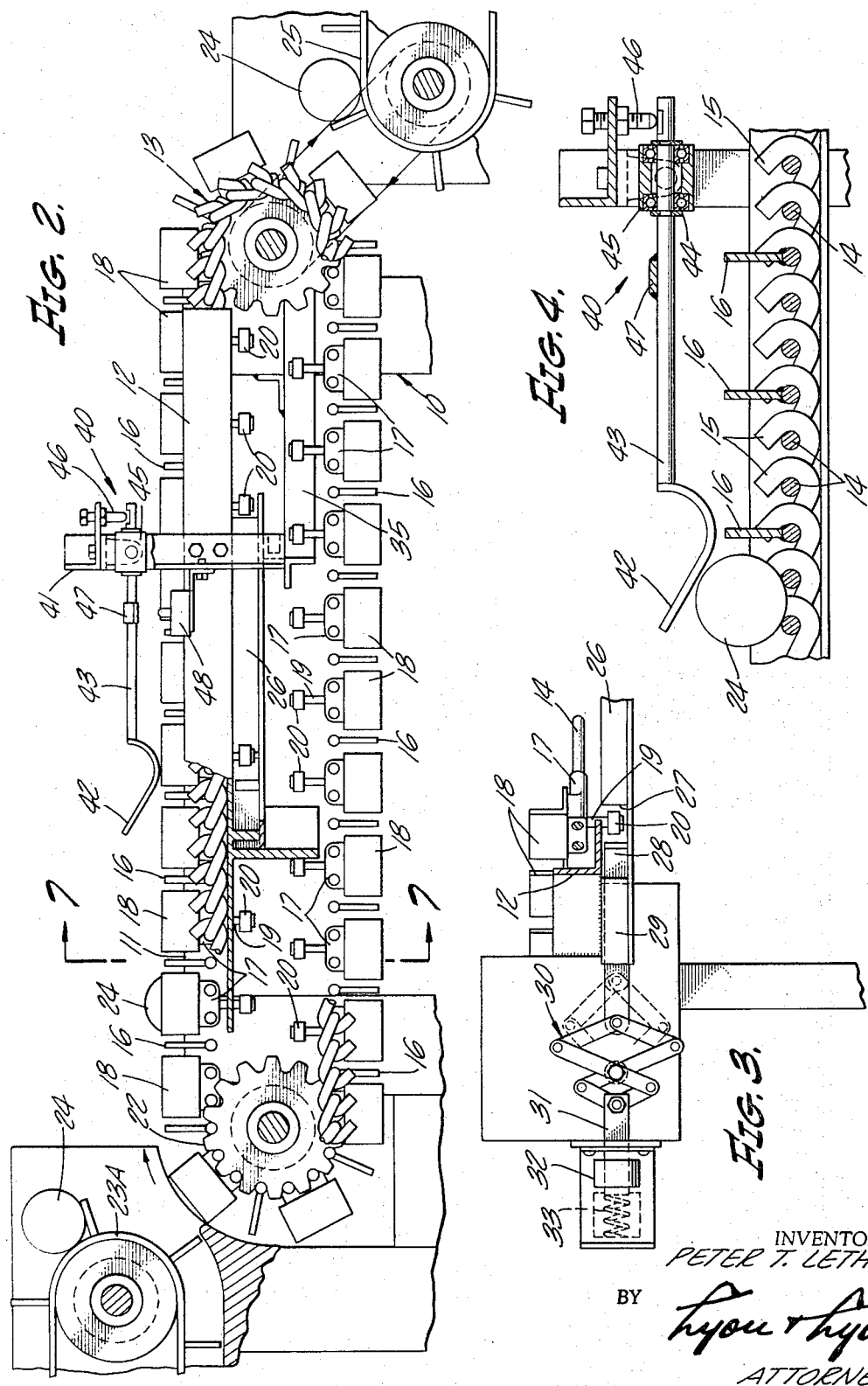
INVENTOR.
PETER T. LETH
BY
Lyon & Lyon
ATTORNEYS Feb. 6, 1968  P. T. LETH  3,367,477
APPARATUS FOR ORIENTING TAPERED AGRICULTURAL PRODUCTS
Filed Oct. 28, 1966  5 Sheets-Sheet 3
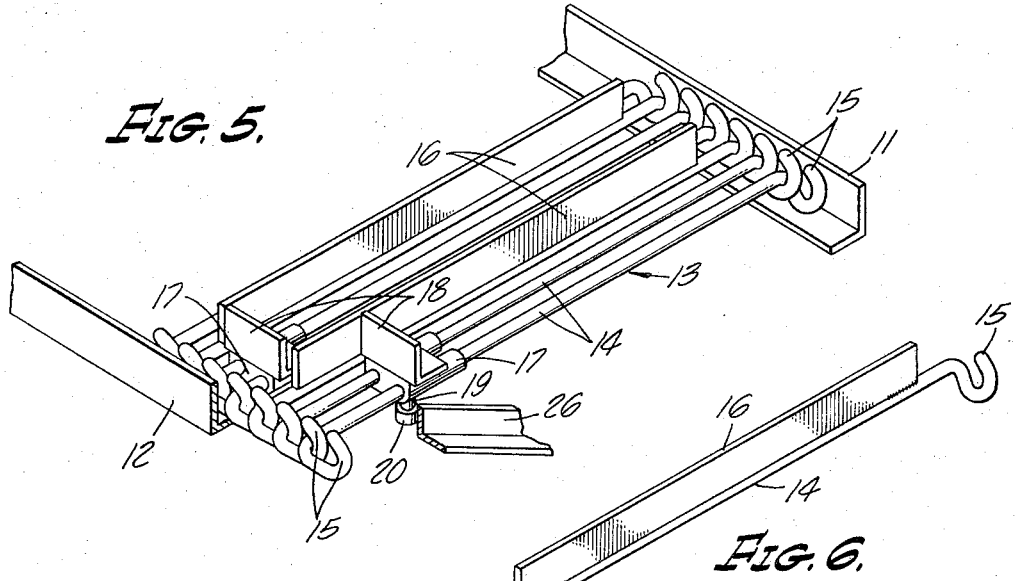
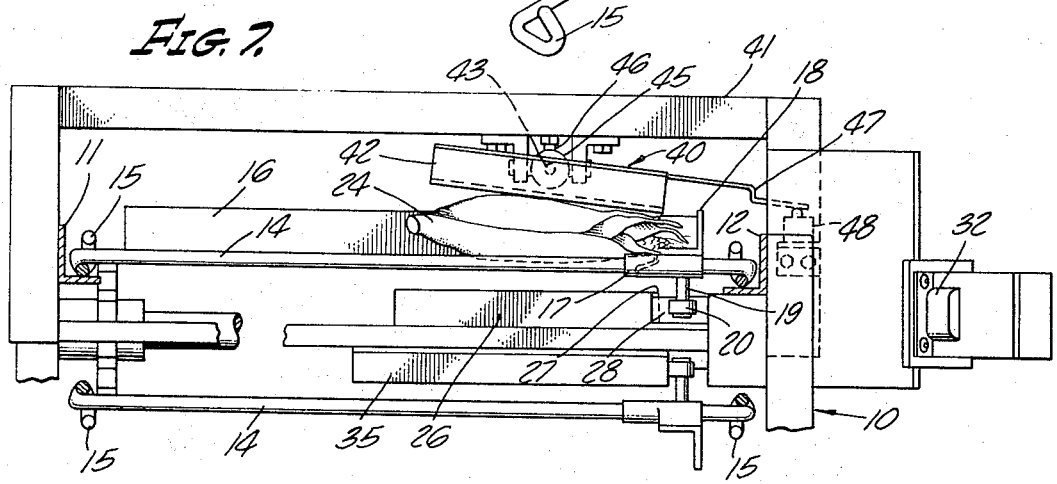
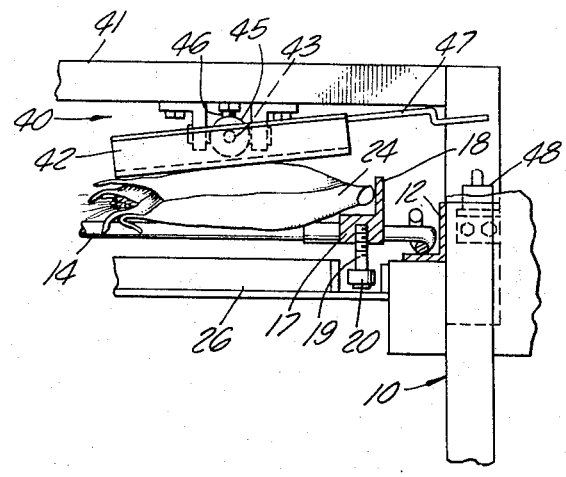
INVENTOR.
PETER T. LETH
BY
ATTORNEYS Feb. 6, 1968 P. T. LETH 3,367,477
APPARATUS FOR ORIENTING TAPERED AGRICULTURAL PRODUCTS
Filed Oct. 28, 1966 5 Sheets-Sheet 4
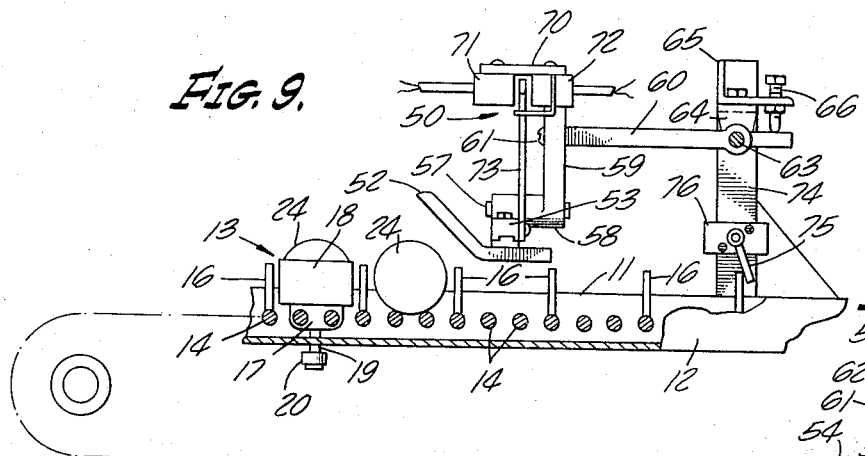
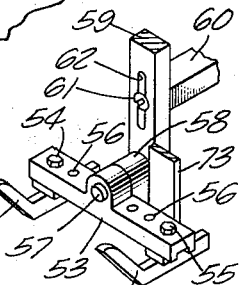
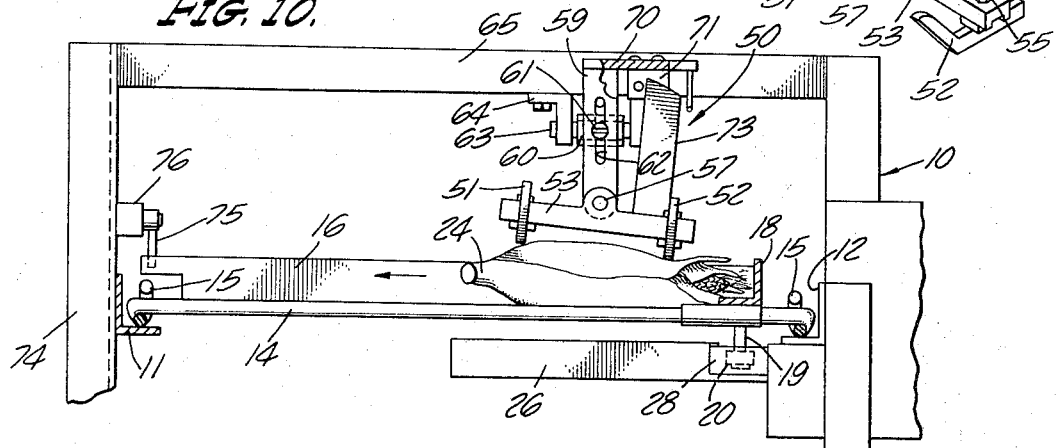
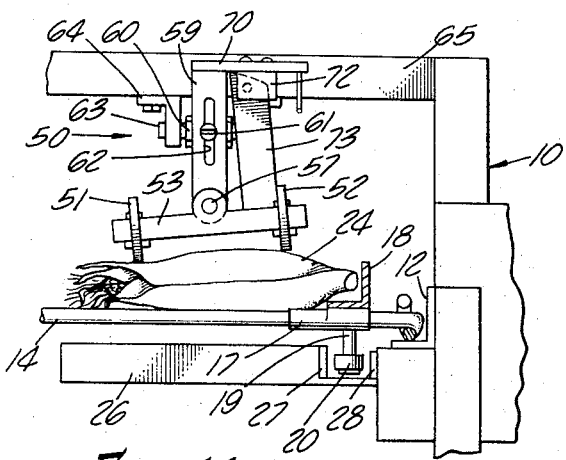
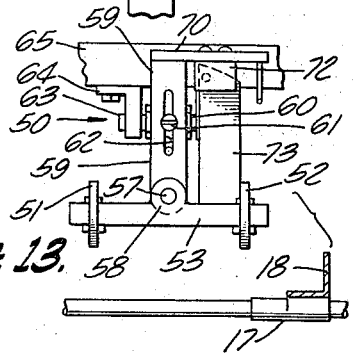
INVENTOR.
PETER T. LETH
BY
*Lyon Lyon*
ATTORNEYS

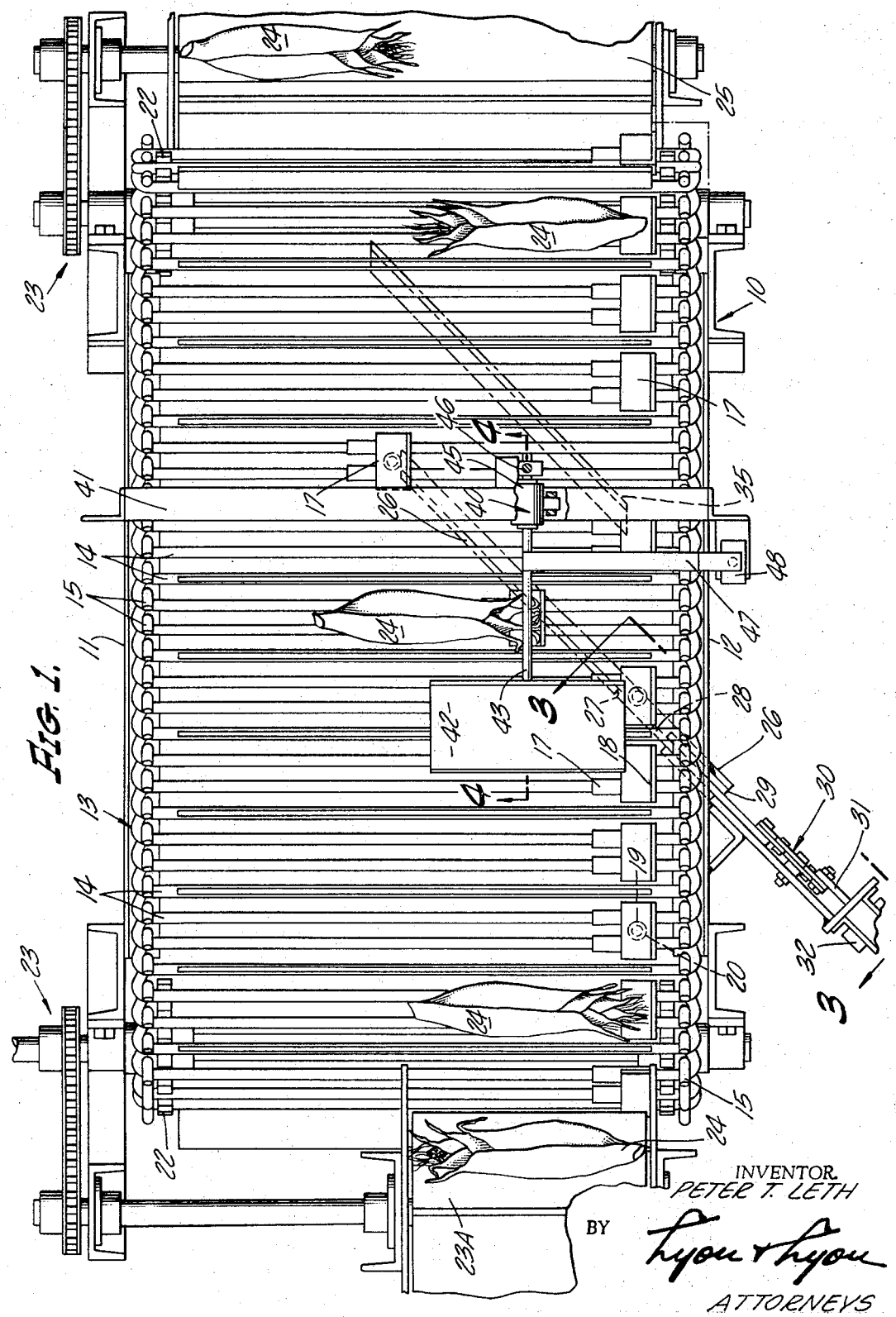

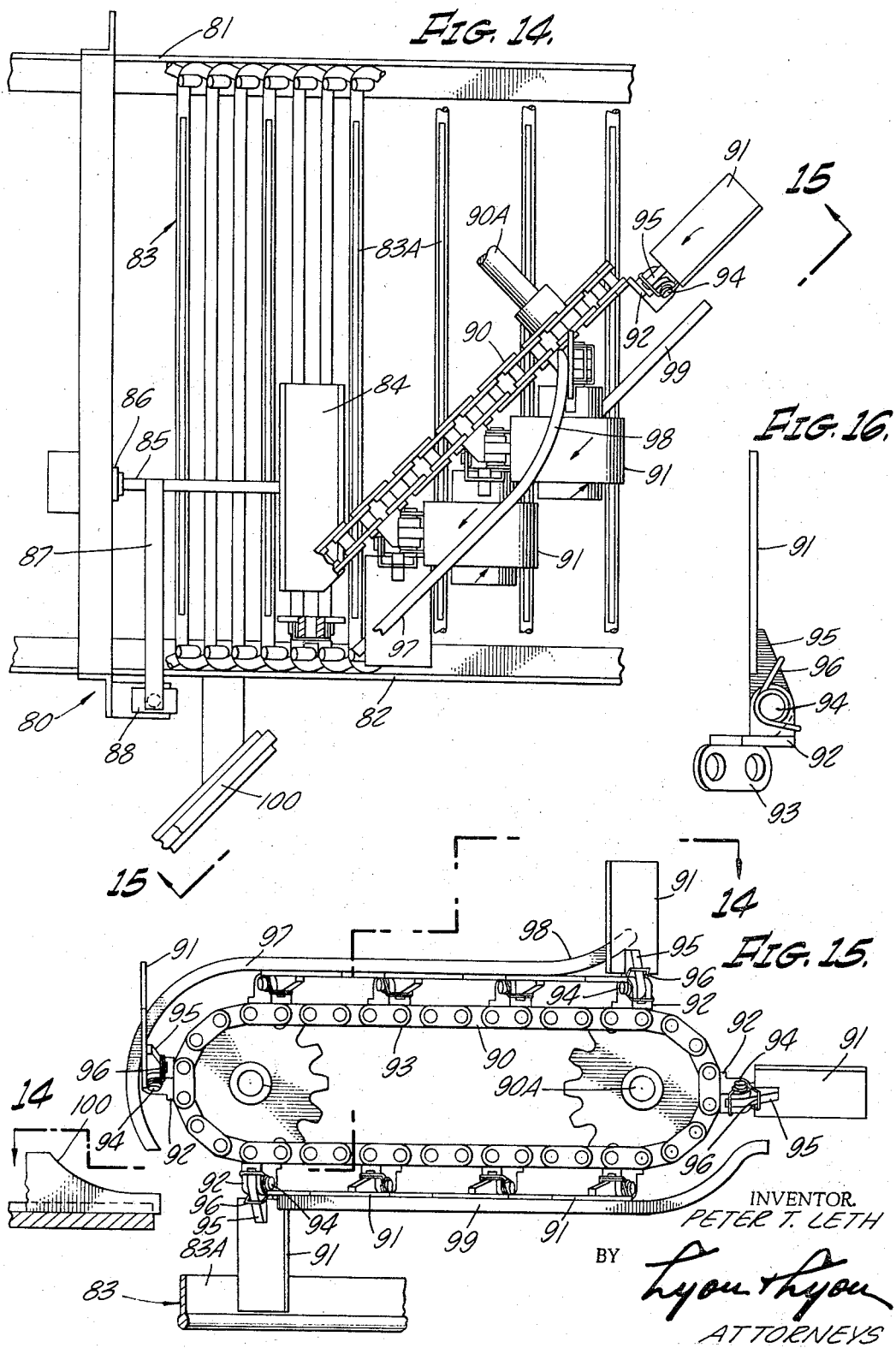

United States Patent Office 3,367,477
Patented Feb. 6, 1968

3,367,477
APPARATUS FOR ORIENTING TAPERED AGRICULTURAL PRODUCTS
Peter T. Leth, Toppenish, Wash., assignor to California Packing Corporation, San Francisco, Calif., a corporation of California
Filed Oct. 28, 1966, Ser. No. 590,426
23 Claims. (Cl. 198—33)

ABSTRACT OF THE DISCLOSURE

Apparatus for orienting elongated tapered products (e.g., ears of corn). The ears are moved by a conveyer having pockets which accommodate the ears, the arrangement permitting the ears to be pushed endwise from one side of the conveyer to the other. In a sensing region the ears are engaged by a tiltable sensing device which in turn controls operation of pusher means that shifts ears of one orientation to the other side of the conveyer.

---

This invention relates to the processing of agricultural products and more particularly relates to apparatus for orienting tapered elongated agricultural products such as sweet corn, carrots, certain types of squash, parsnips, pears, asparagus and the like.

In United States Patent No. 3,268,057, there is disclosed apparatus for orienting tapered agricultural products such as corn so that the large diameter or butt ends of the ears of corn fed to conventional corn husking machinery are pointed in the same direction as required for the proper operation of such machinery. In the patent, this desired orientation is achieved by permitting the ears of corn to roll down an inclined surface whereby the force of gravity in combination with the difference in circumference of the extremities causes the larger diameter ends of the products to roll faster, the products thus rolling in an arc towards the side of the inclined surface nearest which the smallest diameter end of the article is located. Additional apparatus is provided for maintaining the desired orientation and feeding the oriented products to the corn husking machinery. While such apparatus is practical its dimensions are such that it requires a relatively large floor space for a plant installation.

In United States patent application Ser. No. 394,486, filed by Edward E. Ross et al. on Sept. 4, 1964, entitled, "Method and Apparatus for Orienting Tapered Agricultural Products," now abandoned in favor of copending applications S.N. 628,971, S.N. 628,972 and S.N. 628,973, all filed Apr. 6, 1967, assigned to the assignee of the present application, there is disclosed another type of apparatus for orienting such tapered agricultural products. In typical apparatus according to the Ross et al. application S.N. 628,973, the products are moved one after the other to sensing means which cooperates with means for moving products of one orientation away from the products of the other orientation. The embodiments disclosed in said application S.N. 628,973 make use of sensing means in the form of presser members that engage the end portions of the objects and the large ends of products of one orientation are thereby urged against take-away conveyer means of the endless chain or belt type. Apparatus as disclosed in said application S.N. 628,973 has been used commercially with good results. However, under certain operating conditions it is anticipated that the endless take-away conveyers may be subject to fouling by husks and other trash commonly associated with corn, with the result that improper or inefficient orientation of individual ears may occur.

It is therefore an object of the present invention to provide a novel embodiment of the invention disclosed and claimed in said application S.N. 628,973.

It is another object of the present invention to provide such apparatus which takes up a minimum of space and in which the probability of fouling by trash such as corn husks is substantially reduced.

It is also an object of the present invention to provide such apparatus in which the product is positively pushed away from other products in accordance with its orientation.

Another object is to provide novel means for sensing the orientation of the tapered products, and which is characterized by a tilting action.

These and other objects of the present invention will become more apparent upon reference to the accompanying description and drawings in which:

FIGURE 1 is a top plan view of a first embodiment of the present invention;
FIGURE 2 is a side elevation, partly broken away, of the apparatus of FIGURE 1;
FIGURE 3 is a view taken along lines 3—3 of FIGURE 1;
FIGURE 4 is a view partly in section, taken along lines 4—4 of FIGURE 1;
FIGURES 5 and 6 are perspective views of portions of the apparatus of the eembodiment of FIGURE 1;
FIGURE 7 is a view taken along lines 7—7 of FIGURE 2 showing the operation of the apparatus of FIGURE 1 when an ear of corn is pointed in a first direction;
FIGURE 8 is a fragmentary view similar to FIGURE 7 showing the operation of the apparatus of FIGURE 1 when the ear is pointed in the opposite direction;
FIGURE 9 is a partially schematic view of a second embodiment of the present invention;
FIGURE 10 is a detailed view showing the operation of the apparatus of FIGURE 9 when an ear of corn is pointed in a first direction;
FIGURE 11 is a fragmentary detailed view showing the operation of the apparatus of FIGURE 9 when the ear is pointed in the opposite direction;
FIGURE 12 is a perspective view showing a portion of the sensor of the apparatus of FIGURE 9;
FIGURE 13 is a fragmentary view showing the sensor of the apparatus of FIGURE 9 in its normal position;
FIGURE 14 illustrates a third embodiment of the present invention and is taken along lines 14—14 of FIGURE 15;
FIGURE 15 is a view taken along lines 15—15 of FIGURE 14; and
FIGURE 16 is a detailed view of a portion of the drive mechanism of the apparatus of FIGURES 14 and 15.

According to the present invention, an apparatus for orienting tapered agricultural products or the like is provided in which a sensor positioned over a feed table determines the direction in which the individual products are oriented. A portion of the sensor is pivotally mounted so that when it engages the product it is caused to pivot in a direction determined by the orientation of the product. Pivoting of the sensor in a given direction actuates an electrical circuit, either mechanically or optically. Actuation of the electrical circuit causes a pusher mechanism to be energized with the result that the product is left in its initial position. As a result, conveyor. If the sensor is caused to pivot in the opposite direction the circuit is not actuated with the result that the product is left in its initial position. As a result, a line of products is formed on each side of the conveyor, each product in each line having its butt or larger diameter end being pointed toward the side of the conveyor to which it is adjacent. This is the desired condition for feeding of such products to conventional processing equipment such as corn husking machinery.

Turning now to FIGURES 1-8, the details of a first embodiment of apparatus constructed in accordance with the present invention are illustrated. A framework 10 has a pair of side guide channels 11 and 12 across which is driven a flighted conveyor, generally indicated at 13. The flighted conveyor 13 is made up of a plurality of rods 14 (FIGURES 4, 6 and 7) which are provided with hooked ends 15 (FIGURE 7) so that they may be easily joined together to form a continuous chain. To every third rod 14 there is welded or otherwise attached a plate 16 forming a conveyor slot or flight whereby pockets are formed in the conveyor between the flights. It should, of course, be understood that the spacing of the rods 14 and plates 16 would be determined individually for each type of product to be processed so that one and one only of the products would fit in a single flight or pocket and that the present structure is illustrative only and not restrictive.

A carriage 17 (FIGURES 1 and 7) is slidably mounted on the two rods 14 falling between adjacent plates 16 and serves to mount a pusher plate 18. A rod 19 depends from the lower side of the carriage 17 and has a roller 20 mounted thereon. While other types of conveyors and carriages could be used, the type shown is preferred as it permits husks and other trash to drop through the spacing between the rods 14.

The flighted conveyor 13 may be driven in any conventional manner, for example, by a sprocket 22 and sprocket drive 23. If desired, the driving mechanism of conveyor 13 may be part of an overall drive which also drives a flighted feed 23A or another existing type of feed device which sequentially delivers individual products 24 one behind the other to one side of the flighted conveyor 13, and a flighted conveyor 25 which receives the oriented products from the flighted conveyor 13 and typically is a part of the next processing stage, for example, a corn husking machine. The driving mechanism as such forms no part of the present invention and is conventional and is therefore not illustrated or described in detail.

As can best be seen in FIGURE 1, the feed conveyor 23A delivers the products, shown here as ears of corn, one behind the other to the side of the flighted conveyor 13 on which the carriages 17 are normally positioned. As delivered by the feed conveyor 23A, the ears of corn may have their large diameter or butt ends pointed toward either side of the flighted conveyor 13, that is, toward side channel 11 or channel 12. The purpose of the carriage 17 and the pusher plate 18 mounted thereon is to positively drive an ear of corn from adjacent the side channel 12 to adjacent the side channel 11 in the event that the ear of corn has its butt end pointed toward the side channel 11. This is accomplished by providing a guide bar 26 (FIGURES 1, 5 and 7) below the upper run of the conveyor 13 positioned at an angle with the direction of movement of the conveyor 13. Thus, when the guide bar 26 is engaged by the roller 20 mounted on the rod 19 depending from a carriage 17, the guide bar will act as a cam to force the carriage 17 to move along the bars 14 a sufficient distance to move an ear of corn to the other side of the conveyor 13.

In order to permit those ears of corn which have their butt end pointed toward the side channel 12 to remain in their orginal position, the guide bar 26 is provided with an opening 27 (FIGURE 3) large enough to permit the passage therethrough of the rod 19 and roller 20 of a carriage 17. A gate bar 28 (FIGURE 7) is slidably mounted in a guide channel 29 and when actuated serves to close the gap 27 in the guide bar 26 so that the roller 20 of the next succeeding carriage 17 will be engaged by the gate bar 28 and guide bar 26 with the result that the carriage 17 will be caused to move across the bars 14.

The gate bar 28 can be driven by any suitable mechanism. As shown, the inner end of the gate bar 28 is connected to a scissors linkage 30, (FIGURE 3) the other end of which is connected to the armature 31 of a solenoid 32. The solenoid 32 is provided with a spring 33 which returns the armature 31 to its initial position after the solenoid 32 is de-energized. As can be seen, in FIGURE 3 when the solenoid 32 is energized, the armature 31 moves to the left with the result that the scissors linkage 30 causes the gate bar 28 to move across the gap 27 in the guide bar 26.

If the gap 27 in the guide bar 26 has been closed, the carriage 17 moves across the conveyor 13 until it passes beyond the end of the guide bar 26. The carriage remains in its new location until its passes to the underside of the conveyor 13 at which time it engages a return guide bar 35 (FIGURE 2) which is positioned so as to extend out further than the guide bar 26 so as to engage the rollers 20 of any carriages 17 that may have been moved outwardly by the guide bar 26. The inner end of the return guide bar 35 is positioned such that when the carriage 17 is returned to its initial position adjacent the side channel 12, it will be freed from engagement with the return guide bar 35.

In order to determine which ears of corn should be left in their initial position, that is, next to the side channel 12, and which should be pushed to the other side of the conveyor, there is provided a sensor, generally indicated at 40, for determining the direction in which the butt end of the ear is pointing. The sensor 40 is mounted on a cross bar 41 attached to the remainder of the frame work 10 and positioned above the flighted conveyor 13. The details of the sensor 40 and the manner in which it operates can best be seen in FIGURES 4, 7 and 8.

A detector plate 42 having an inclined leading surface is mounted on a shaft 43. This shaft is journalled for rotation in a bearing 44 mounted in a housing 45 which in turn is rotatably mounted on the cross bar 41. A set screw 46 (FIGURE 1) is provided for adjusting the spacing and angle of attack of the detector plate 42 relative to the conveyor 13. An arm 47 is mounted on the shaft 43 and is adapted to engage a microswitch 48 when the detector plate 42 and shaft 43 are rotated a sufficient distance in the clockwise direction as viewed in FIGURE 7.

Such a rotation will be caused, for example, by the detector plate 42 coming into engagement with an ear of corn which has its butt end pointed toward the side channel 11. As can be seen in FIGURE 7, the detector plate 42 rotates to follow the contour of the ear of corn 24 passing beneath it. If the ear of corn has its butt end pointed toward the side channel 11, the detector plate 42 and shaft 43 will rotate in the clockwise direction with the result that the arm 47 depresses the movable contact of the microswitch 48 to close an electrical circuit to the solenoid 32. As a result, the solenoid is actuated and the gate bar 28 extended to block the gap 27 in the guide bar 26. Consequently, the roller 20 associated with the carriage 17 mounted in the flight of the conveyor 13 which contains the improperly oriented ear of corn will engage the gate bar 28 and will be caused to move along the gate bar 28 and guide bar 26 moving the carriage 17 with it. The pusher plate 18 mounted on the carriage 17 engages the ear of corn and pushes it across the flighted conveyor 13 until its butt end is adjacent the side channel 11.

In the event that the butt end of the ear of corn is directed toward the side channel 12, the detector plate 42 and shaft 43 will pivot in the counterclockwise direction as shown in FIGURE 8. When the detector plate so pivots, the arm 47 will not engage the movable contact of the microswitch 48 and the circuit will not be closed, nor the solenoid 32 actuated. Consequently the gap 27 in the guide bar 26 remains open and the roller 20 of the carriage 17 associated with this flight of the conveyor 13 passes through the gap 27 leaving the ear of corn unmoved. As can be seen, as a result of the operation just described, the ears of corn will be aligned along the side of the conveyor towards which their butt ends point. They will be delivered in this orientation to the flighted conveyor 25 and thus to the corn husking machinery or other processing equipment in this desired orientation. The sensor 40 must, of course, be properly positioned relative to the initial position and size of the product being processed so that only the desired tapered surface of the product is detected.

Turning now to FIGURES 9, 10, 11, 12 and 13, there is shown a second embodiment of the present invention. In this embodiment, the conveyor and its associated driving apparatus may be identical to that described in connection with the previous embodiment, and the same reference numerals will be used to identify the same elements. In the embodiment of FIGURES 9-13, however, the sensor utilizes a photoelectric circuit for closing the circuit to the solenoid which operates the gate bar. As illustrated, the sensor, generally indicated at 50, includes a pair of runners 51 and 52 for engaging the ears of corn 24. The runners 51 and 52 are affixed to a bar 53 by bolts 54 and 55 which may be passed through any of a series of holes 56 formed in the bar 53 so that the spacing between the runners 51 and 52 can be varied to accommodate products of different sizes. The bar 53 is pivotally mounted on a shaft 57 supported in a housing 58. The housing 58 has a member 59 extending upwardly therefrom, the member 59 being bolted to a lever 60 by a bolt 61. In order to permit the housing 58 and consequently the runners 51 and 52 to be moved relative to the conveyor 13, the member 59 is provided with a slot 62 through which the bolt 61 passes.

The lever 60 is pivotally mounted on a shaft 63 supported by a bracket 64 affixed to cross beam 65 which forms a part of the framework of the apparatus. A set screw 66 is provided so that the lever 60 can rotate to change the spacing and the angle of attack of the runners 51 and 52 relative to the product 24.

A plate 70 is mounted on the top of the member 59 and extends outwardly to one side thereof. Supported from the plate 70 are a pair of housings 71 and 72, one of which contains a light source and the other of which contains a photocell. The housings 71 and 72 are spaced sufficiently apart to permit the positioning between them of a shutter 73 which is mounted on the bar 53. Mounted on a side brace 74 of the framework of the apparatus is a movable contact 75 of a timer switch 76. The movable contact 75 is positioned so as to be engaged by one of the upstanding plates 16 of the conveyor 13 during the time that a product is passing under the sensor. The purpose of the switch 76 is to close the circuit to the solenoid only during the time that the orientation of a product is being sensed so that the operation of the photocell circuit is effective only at this time.

The operation of the embodiment just described is similar to the first embodiment described with the exception that the solenoid is controlled by the movement of the shutter 73 between the housings 71 and 72 and, more particularly, between the light source and the photocell positioned within the housings 71 and 72. As shown in FIGURE 10, when the butt end of an ear of corn is directed toward the side channel 11, the engagement of the runners 51 and 52 with the ear of corn cause the arm 53 and consequently of the shutter 73 to move in the clockwise direction. This movement of the shutter 73 removes it from between the lamp and the photocell mounted in the housings 71 and 72 and causes the photocell to be illuminated, thus lowering its resistance and permitting sufficient current to flow to the solenoid to actuate it. Upon actuation of the solenoid, the gate bar 28 is moved across the gap 27 in the guide bar 26 with the result that the pusher plate 18 and the ear of corn are moved across the conveyor 13 in the same manner as previously described.

If, on the other hand, the butt end of an ear of corn is directed toward the side channel 12, as shown in FIGURE 11, the plate 53 and shutter 73 are caused to rotate in the counterclockwise direction. Because of the initial positioning of the shutter 73 relative to the lamp and photocell mounted in housing 71 and 72, the shutter continues to block the optical path between the lamp and the photocell with the result that the solenoid is not actuated and the roller 20 and rod 19 of the carriage 17 is permitted to pass through the gap 27 in the guide bar 26. FIGURE 13 shows the position of the shutter 73 in its normal state, that is, in the absence of a product being contacted by the runners 51 and 52.

Turning now to FIGURES 14, 15 and 16, there is shown a third embodiment of the present invention. This embodiment of the invention is adapted to be attached to present day corn husking machinery, such as an FMC Corporation corn husker, thus eliminating the need for the separate feed table such as is present in the embodiment of FIGURE 1. In the apparatus shown in FIGURES 14, 15 and 16, a framework generally indicated at 80 is provided with side guide channels 81 and 82 across which is driven a flighted conveyor, indicated generally at 83. The construction of the conveyor 83 is shown as similar to the construction of the conveyor 13; however, it should be apparent that any suitable type of flighted conveyor may be used in place of the one illustrated. A detector plate 84 is mounted above the flighted conveyor 83 on a shaft 85 journalled for rotation in a housing 86. The shaft 85 is provided with an arm 87 adapted to close a microswitch 88 when the detector plate 84 is caused to rotate in the clockwise direction as a result of being engaged by any ear of corn which has its butt end pointed toward the side channel 81. This sensing mechanism is thus essentially similar in operation to the sensing mechanism of the embodiment illustrated in FIGURES 1-8.

A roller chain 90 is suspended diagonally above the flighted conveyor 83 and is provided with a plurality of spring loaded rectangular plates 91 spaced along the chain to match the flights of the conveyor 83. Chain 90 is driven by a connection, not shown, to shaft 90A from the drive of flighted conveyor 83 so as to retain a timed relationship and constant spacing of plates 91 and conveyor flights 83A. The spring loading of the plates 91 can be accomplished in any suitable manner, one of which is shown in FIGURE 16. As best shown in this figure, a bracket 92 is welded to one of the links 93 of the chain 90 and a shaft 94 is mounted in the bracket 92 and has a member 95 rotatably mounted thereon. A spring 96 is provided for biasing the member 95 and the plate 91 mounted on the member 95 in a vertical position. A guide bar 97 is positioned above the chain 90 and serves to force the plates 91 from a vertical to a horizontal position against the force of the spring 96. In order to initially force the plates 91 to the horizontal position, the guide bar 97 is provided with a curved end 98 that serves as a cam for this purpose. A similar guide bar 99 is positioned below the chain 90 and serves to keep horizontal those plates 91 that are already horizontal when they reach the guide bar 99 and thus keep them clear of the conveyor 83.

The gap between the ends of the guide bars 97 and 99 is normally filled by a slider 100 contoured so as to maintain a complete surface around a loop formed by the guide bar 97, slider 100 and guide bar 99. The slider 100 is normally maintained in the gap closing position by a spring (not shown). However, when a solenoid (not shown) is actuated, the slider is moved away from the gap between the guide bars 97 and 98. This solenoid, of course, is actuated by closing of the microswitch 88.

The operation of the just described apparatus should be obvious from the foregoing. If an ear of corn that passes under the detector plate 84 has its butt end pointed toward the side channel 82, the slider 100 fills the gap between the guide bars 97 and 99 and plates 91 driven across this gap by the chain 90 will be maintained in the horizontal position. However, if an ear of corn has its butt end directed toward the side channel 81, the detector plate 84 will be rotated in the clockwise direction with the result that the arm 87 will cause the microswitch 88 to be closed and the solenoid to be actuated. Actuation of the solenoid withdraws the slider 100 from the gap between the guide bars 97 and 99 with the result that the plate 91 passing over the slider 100 at this instant will be forced into the vertical direction by the spring 96. The plate 91 will thus extend down into the flight of the conveyor 83 containing the ear of corn to be moved and the chain 90 will drive the plate 91 across the flight as the conveyor 83 is driven in the forward direction. As the end of the run of the chain 90 is reached, the plate 91 will be lifted up out of the flight of the conveyor 83 and the ear of corn will be moved no further. Of course, as soon as the particular flight containing this ear of corn is moved from under the detector plate 84, the detector plate assumes its normal position, the circuit is opened, and the slider 100 is returned to its gap blocking position.

From the foregoing description, it can be seen that apparatus has been provided for forming two lines of tapered products along the two sides of a flighted conveyor, each line of products containing only products having their large diameter end pointed in the desired direction. Although as illustrated and described the product processed has been corn, it should be obvious that other tapered agricultural products could equally well be handled. It should also be obvious that although the apparatus has been described as moving the products in the direction of their larger diameter end, if desired, the products could be moved in the direction toward which their smaller diameter ends are pointed. It should be understood that while certain mechanical details have been illustrated so that the principle of the invention can be described with clarity, these details are meant to be illustrative only and not restrictive as those skilled in the art will be capable of substituting many other mechanisms that are equivalent to those illustarted and described.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for orienting elongated tapered agricultural products, comprising:
   conveyor means having a plurality of parallel pockets therein for receiving individual ones of said products, said pockets being longer than the length of said products and extending transversely to the direction of movement of said conveyor means;
   means for delivering said products to one side of said pockets whereby the products are conveyed one behind the other to a sensing region;
   means at the sensing region and positioned adjacent said conveyor means for sensing the direction in which the larger diameter end of a product in a pocket is pointed; and
   means responsive to said sensing means for pushing against one end of a product pointed in an undesired direction to move such product endwise to the other side of said pocket.

2. The apparatus of claim 1 wherein said sensing means comprises means brought into engagement with said product and rotatably mounted so as to rotate in the direction of taper of said product.

3. The apparatus of claim 2 wherein rotation of said engaging means in a first direction actuates an electrical switch, said last named means being controlled by said switch.

4. The apparatus of claim 2 wherein rotation of said engaging means in a first direction actuates a photoelectric means, said last named means being controlled by said photoelectric means.

5. The apparatus of claim 1 wherein said responsive means comprises a carriage mounted in said pocket for movement thereacross, a portion of the carriage being disposed to push against the end of an adjacent product.

6. The apparatus of claim 1 wherein said last named responsive means comprises a member movable within said pocket from one side of the pocket to the other.

7. The apparatus of claim 1 wherein said conveyor means comprises a plurality of spaced rods selected ones of said rods having upstanding plates affixed thereto to form said pockets.

8. The apparatus of claim 7 wherein said means responsive to the sensing means includes a carriage slidably mounted on the rods between each pair of said selected ones of said rods, and wherein guide means are positioned adjacent said conveyor means for selectively engaging said carriages and driving them across their respective pocket.

9. The apparatus of claim 8 wherein said sensing means comprises means brought into engagement with said product and rotatably mounted so as to rotate in the direction of taper of said product.

10. Apparatus for orienting tapered agricultural products comprising:
    a flighted conveyor having a plurality of pockets therein for receiving individual ones of said products, said pockets being longer than the length of said products;
    pusher means mounted in each of said pusher means being normally positioned adjacent one side of said conveyor;
    means for delivering said products to said pockets on said one side of said conveyor;
    sensing means positioned above said conveyor and having means for engaging a product passing therebeneath, said engaging means being rotatably mounted so as to rotate in the direction of taper of said product;
    guide means positioned adjacent said conveyor, said guide means upon engaging said pusher means causing said pusher means to move across said pocket;
    means operable to cause engagement of said pusher means by said guide means; and
    means responsive to rotation of said engaging means in a first direction to operate said operable means whereby said pusher means moves a product pointing in an undesirable direction across said pocket to the other side thereof.

11. The apparatus of claim 10 wherein said engaging means are mounted on a rotatable shaft having an arm mounted thereon, rotation of said rotatble shaft as a result of rotation of said engaging means in said first direction causing said arm to operate an electrical switch, operation of said electrical switch causing operation of said operable means.

12. The apparatus of claim 10 wherein said engaging means are mounted on a rotatable shaft having a shutter mounted thereon and wherein are provided a lamp and photosensitive means, rotation of said rotatable shaft as a result of rotation of said engaging means in said first direction causing said shutter to vary the light falling on said photosensitive means, variation of the light falling on said photosensitive means causing operation of said operable means.

13. The apparatus of claim 10 wherein said guide means comprises a bar arranged at an angle with the direction of movement of said conveyor and having a gap therein through which said pusher means may pass, and wherein said operable means comprises a gate bar for closing said gap and a solenoid for actuating said gate bar.

14. The apparatus of claim 13 wherein a second bar is provided in the return run of said conveyor for engaging any of said pusher means previously engaged by said guide means and returning them to their original position.

15. The apparatus of claim 14 wherein said conveyor comprises a plurality of spaced rods, selected ones of said rods having upstanding plates affixed thereto to form said pockets and wherein said pusher means comprises a carriage slidably mounted on rods between said selected rods, and having roller means depending therefrom for engaging said guide means.

16. The apparatus of claim 10 wherein said engaging means comprises a plate having an inclined leading surface for engaging said products.

17. The apparatus of claim 10 wherein said engaging means comprises a pair of spaced runners for engaging said product.

18. Apparatus for orienting tapered agricultural products comprising:
   a flighted conveyor having a plurality of pockets therein for receiving individual ones of said said products, said pockets being longer than the length of said products;
   means for delivering said products to said pockets on one side of said conveyor;
   sensing means positioned above said conveyor and having means for engaging a product passing therebeneath, said engaging means being rotatably mounted so as to rotate in the direction of taper of said product;
   drive means positioned above said conveyor at an angle with the direction of movement of said conveyor;
   a plurality of pusher means, mounted on said drive means, each of said pusher means normally biased to enter one of said pockets at said one side thereof whereby it is driven across said pocket by said drive means;
   means operable to prevent said pusher means from entering said pockets; and
   means responsive to rotation of said engaging means in a first direction to render said operable means inoperable whereby said pusher means enters a pocket containing a product pointing in an undesired direction and drives it across said pocket to the other side thereof.

19. The apparatus of claim 18 wherein said drive means comprises a chain and in which said pusher means comprise plates mounted on said chain and spring biased in a vertical position.

20. The apparatus of claim 19 wherein first and second guide bars are provided above and below said chain for forcing said plates into the horizontal position and wherein a gap is left between said bars.

21. The apparatus of claim 20 wherein said gap is normally filled by a slider which retains said plates in the horizontal position as they pass over said flights.

22. The apparatus of claim 21 wherein said responsive means includes a solenoid operable to move said slider out of said gap whereby a plate passing over said gap assumes the vertical position and enters the pocket positioned therebelow.

23. Apparatus for orienting elongated tapered agricultural products, comprising:
   conveyor means for conveying the products one behind the other to a sensing region, with the axes of the products generally parallel and extending transversely to the direction of movement;
   sensing means at the sensing region to engage and sense the endwise orientation of the products, said sensing means including means brought into engagement with each of said products and rotatably mounted so as to rotate in the direction of taper of the products; and
   means responsive to said sensing means for moving products of one orientation in an endwise direction away from products in the other orientation.

References Cited
UNITED STATES PATENTS

| | | | |
|---|---|---|---|
| 1,872,903 | 8/1932 | Cutter | 209—90 X |
| 3,049,231 | 8/1962 | Crandall et al. | 209—91 X |
| 2,649,613 | 8/1953 | Danielsson | 198—30 X |
| 3,167,171 | 1/1965 | Harmon et al. | 198—41 |
| 3,190,432 | 6/1965 | Vanderhoof | 198—31 |
| 3,233,719 | 2/1966 | Engel | 198—31 |
| 3,289,808 | 12/1966 | Simmons | 198—33 |

FOREIGN PATENTS

| | | |
|---|---|---|
| 387,862 | 2/1933 | Great Britain. |

EVON C. BLUNK, *Primary Examiner.*

R. J. HICKEY, *Assistant Examiner.*